United States Patent Office 3,365,239
Patented Jan. 23, 1968

3,365,239
APPARATUS FOR FEEDING STUBS
Desmond Walter Molins, London, England, and Geoffrey Alexander Cruickshank, Potts Point, New South Wales, Australia, assignors to The Molins Organisation Limited, London, England
Continuation of application Ser. No. 540,397, Apr. 5, 1966. This application Apr. 18, 1967, Ser. No. 631,839
Claims priority, application Great Britain, May 21, 1963, 20,194/63
21 Claims. (Cl. 302—2)

This application is a continuation of my prior filed copending patent application Ser. No. 540,397 filed Apr. 5, 1966.

This invention relates to apparatus for receiving rod-like articles, such as stubs, fed lengthwise and in line through a conduit under the influence of air flowing therethrough, and relates more particularly to such apparatus including means for arresting the lengthwise motion of the articles and feeding them laterally. Such apparatus will be referred to as "apparatus as specified."

In the present specification the term "rodlike articles" is intended to mean cigarettes, whether plain or filter-tipped or with any other form of mouthpiece, or cigars, or "stubs" and the term "stub" is intended to include any sort of mouthpiece portion for a cigarette, such as a piece of filtering material, which is capable of being fed through a conduit by the flow of air therethrough, whether the length of the stub is the length required in a finished cigarette, or a multiple of such length.

An example of apparatus in which stubs are fed lengthwise through a conduit under the influence of air flowing therethrough is disclosed in United States patent specification No. 3,062,588. In that specification a plate having an aperture slightly larger than a stub is provided at the end of the guide conduit, and a rotor having channels is journalled in the plate so that, on rotation, each channel successively becomes aligned with the aperture, and receives the stub at that moment in the aperture, the stub moving lengthwise into the channel. The lengthwise motion of this stub is arrested by a stop at the other end of the rotor, and the stub is carried away laterally by rotation of the rotor. The stubs are double the length required in a mouthpiece cigarette, and are transferred from the rotor into stub-assembling apparatus to be placed between, and united with, cigarettes. The resulting assemblages are then each severed through the centre of the stub to produce two mouthpiece cigarettes.

If the stubs are long, either because the length of stub required for each cigarette is long, or because the stubs are multiples of the lengths required for each cigarette, or for both these reasons, or when dealing with cigarettes or cigars, difficulty is experienced in feeding the articles lengthwise into the channels due to the length of time required for each article to be received completely in the channel.

According to the present invention there is provided apparatus as specified comprising guide means having a passage therethrough, and connected to the conduit through which the rodlike articles are fed lengthwise and in line by air flowing therethrough, so that each successive foremost article is ejected from the passage, stop means in line with the passage to arrest the lengthwise motion of the foremost article and spaced more than the length of the article from the passage, support means on which the article is supported after leaving the passage, a conveyor having channels arranged at right angles to its direction of motion, such as a fluted drum, and situated in relation to the line of travel of the articles leaving the passage so that its channels are parallel with the article and always laterally displaced therefrom, and pusher means to push the foremost article laterally to be received in a channel of the conveyor after the article has come to rest against the stop means.

Difficulty can be experienced in removing laterally the foremost article when its lengthwise motion has been arrested, whether the article is removed laterally by means such as a fluted drum or by pusher means, in that the foremost article is trapped between the stop means which has arrested its lengthwise motion, and the succeeding article.

Clamping means may therefore be provided to prevent lengthwise motion of the following article, and retracting means to retract the stop means in the direction of lengthwise motion of the articles, the clamping means and the retracting means being operated in that order after the lengthwise motion of the foremost article has been arrested and before the pusher means operates on the foremost article.

The pusher means may push each foremost article directly into a channel of the conveyor and the clamping means, the retracting means and the pusher means may be operated in timed relationship with movement of the conveyor.

Alternatively the pusher means may push each succeeding foremost article into a hopper and the articles may be removed from the hopper by the conveyor means.

Further according to the invention there is provided apparatus for handling rodlike articles comprising article-feeding means, a guide conduit to receive articles endwise and in line from the feeding means, means to supply air to the conduit to urge the articles therethrough, a hopper for the articles, article-receiving means to receive articles from the conduit and to separate each successive foremost article from the succeeding article and feed it into the hopper, means to remove articles from the hopper, detector means to detect a predetermined quantity of articles in the hopper and to stop the article-feeding means, means to detect less than a predetermined quantity of articles in the guide conduit and to stop the article-receiving means, the article-feeding means being adapted and arranged to feed articles at a greater rate than the rate of removal of articles from the hopper.

Two embodiments of the present invention will now be described, by way of example, with reference to the accompanying drawings of which.

The following description deals with stubs but it will be appreciated that cigarettes or cigars could be dealt with in the same manner.

Figure 1:
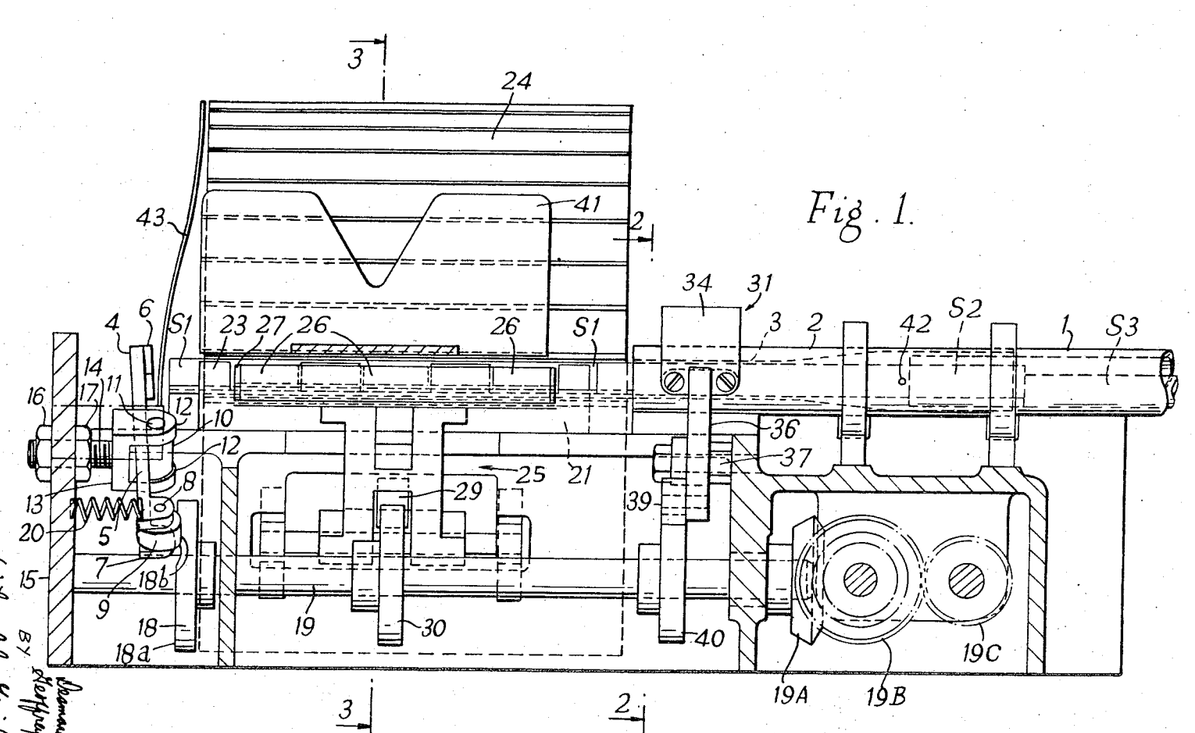
FIGURE 1 is a side elevation, with parts in section, of apparatus as specified.
Figure 2:
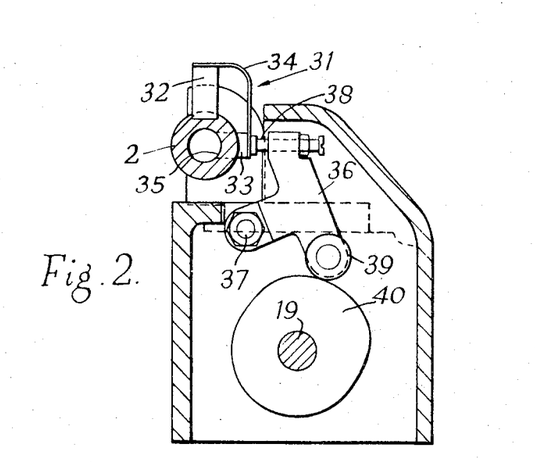
FIGURE 2 is a section on the line 2—2.
Figure 3:
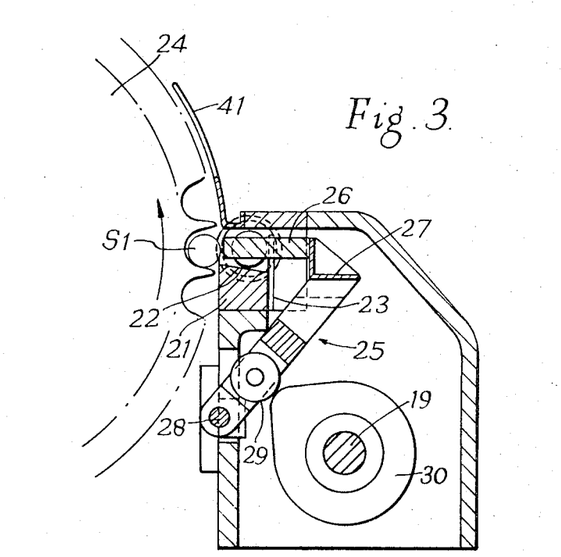
FIGURE 3 is a section on the line 3—3.

Referring first to FIGURES 1, 2 and 3, stubs are fed lengthwise and in line through a conduit 1 by means of air flowing through the conduit. The conduit may be made of translucent material, e.g. polythene. The stubs may be introduced into the conduit by means similar to those disclosed in United States patent specification No. 3,062,588. In the present embodiment the stubs are each six times the length of a stub to form the mouthpiece end of a cigarette. The downstream end of the conduit 1 is shown in FIGURE 1 and has its end reduced in diameter and retained within a guide means 2. The guide means 2 has a passage 3 therethrough which is reduced in diameter toward its left-hand end as seen in FIGURE 1, to be only slightly larger than the diameter of the stubs. Three circumferentially-spaced holes 42 (only one of which is shown) exhaust the air from the passage 3. A stop means 4 is spaced from the guide means 2 and comprises a lever 5 having at one end a stop member 6 of rubber secured to it, and in line with the passage 3, and at its other end two lugs 7 between which extends a pin 8 carrying a rotatable roller 9. The lever 5 has a lug 10 through which passes a pivot pin 11 carried by two lugs 12 of a yoke member 13. The yoke carries a threaded portion 14 which passes through the end wall 15 and is held thereto by two nuts 16 and 17. This arrangement permits adjustment of the pivot pin 11 towards and away from the guide means 2.

The roller 9 is loaded into contact with an end cam 18 carried on a shaft 19, by means of a compression spring 20. The cam has two portions 18a and 18b, and the arrangement is such that when the roller 9 is riding on the cam portion 18a the stop member 6 is spaced more than the length of a stub away from the end of the passage 3, and when the roller 9 is riding on the short cam portion 18b the stop member 6 is retracted to be further away from the passage 3.

Between the end of the passage 3 and the stop member 6 is a support member 21 (see also FIGURE 3) with an inclined surface 22 to support the foremost stub after it has left the passage 3. The stub is prevented from rolling off the surface 22 by a plate 23.

A fluted drum 24 is situated in relation to the line of travel of the stubs leaving the passage 3 so that its flutes are parallel with the foremost stub and laterally displaced from it. An aligning plate 43 is provided at the end of the drum 24, as shown in FIGURE 1. A curved plate 41 is provided to retain the stubs in the flutes of the drum 24. The fluted drum 24 forms part of a machine in which the stubs are combined with cigarettes to form mouthpiece cigarettes in any convenient manner.

A pusher means 25 has three pusher members 26 carried by an angle member 27 and is pivotally mounted at 28. The pusher means 25 also carries a roller 29 which bears against a cam 40 carried by the shaft 19. The memer members pass through corresponding apertures in the plate 23.

A clamping means is provided at 31 (see also FIGURE 2) and comprises a member 32 secured to the guide means 2, and a clamping member 33 which is carried from the member 32 by a bent blade spring 34 and passes through an aperture in the wall of the guide member 2. The member 33 has a part-cylindrical end face 35 which fits closely against the side of a stub and prevents the stub from moving lengthwise in the passage 3 when the member 33 is pushed to the left as seen in FIGURE 2. A rocker arm 36 for moving the member 33 into the clamping position is pivotally mounted at 37 and has an adjustable screwed member 38 at its upper end to bear against the rear face of the spring 34. At its lower end the rocker arm 36 carries a roller follower 39 which bears agains a cam 40 carried by the shaft 19. The member 33 is returned from the clamping position by the spring 34.

The clamping means 31, the stop means 4 and the pusher means 25 are operated in that order, and in timed relationship with the rotation of the fluted drum 24 so that, as each flute of the drum comes into the position shown in FIGURE 3, first the clamping member 33 moves into the passage 3, then the stop member 6 is retracted into the position shown in FIGURE 1, and finally the pusher members 26 push the foremost stub into the adjacent flute of the drum. The shaft 19 is driven through gears 19A, 19B and 19C from the means driving the machine of which the fluted drum 24 forms part.

The apparatus described operates in the following manner. A line of stubs is blown through the conduit 2 and the foremost stub $S_1$ passes through the passage 3 on to the inclined surface 22 of the support member 21, and has its lengthwise motion arrested by the stop member 6 which is in the non-retracted position, i.e. the roller 9 is on the cam surface 18a. The stub $S_1$ is therefore spaced laterally from the drum 24, and is also displaced slightly forwardly relative to the drum. The succeeding stub $S_2$ is pushed by the next stub $S_3$ so that its leading end is outside the passage 3 and is abutting the trailing end of the stub $S_1$. The air flowing through the conduit 1 is exhausted through the holes 42 in the guide means 2, but the part of the trailing end of the stub $S_2$ is exposed to air pressure which urges it against the stub $S_1$.

The shaft 19 is rotating continuously in timed relation with rotation of the drum 24, and when the stub $S_1$ has been arrested by the stop member 6 the cam 40 rotates to the position shown in FIGURE 2 and the clamping member 33 moves into the passage 3 to hold the stub $S_2$. Further rotation of the shaft 19 rotates the cam 18 to the position shown in FIGURE 1, and the stop member 6 moves away from the leading end of the stub $S_1$. The stub $S_1$ remains in position because the clamping member 33 prevents the stub $S_2$ from moving the stub $S_1$ forward. Further rotation of the shaft 19 brings the cam 30 to the position shown in FIGURE 3, at which time a flute is opposite the stub $S_1$, and the stub is pushed laterally into the flute by the pusher members 26, as shown in FIGURE 3.

Further rotation of the shaft 19 causes the pusher members 26 to be withdrawn out of the path of stubs, then the stop member 6 to be moved into its non-retracted position when the roller 9 rides up on to the cam surface 18a, and then the clamp member 33 to be withdrawn. The stub $S_2$ is now free to move forward and is ejected from the passage 3 and is treated in the same manner as the stub $S_1$ to be eventually transferred into the succeeding flute. The stub $S_3$ moves into the position previously occupied by the stub $S_2$. Thus, after each successive foremost stub $S_1$, $S_2$, $S_3$ etc. has its lengthwise motion arrested by the stop member 6 it is pushed laterally into the next vacant flute of the drum.

Rotation of the drum 24 carries the stubs past the aligning plate 43 which pushes them along the flutes until their ends are aligned.

In the second embodiment of the apparatus illustrated in FIGURES 4 to 8 inclusive part of the apparatus is the same as that used in the first embodiment, and the same reference numerals will be used for identical parts.

Figure 4:
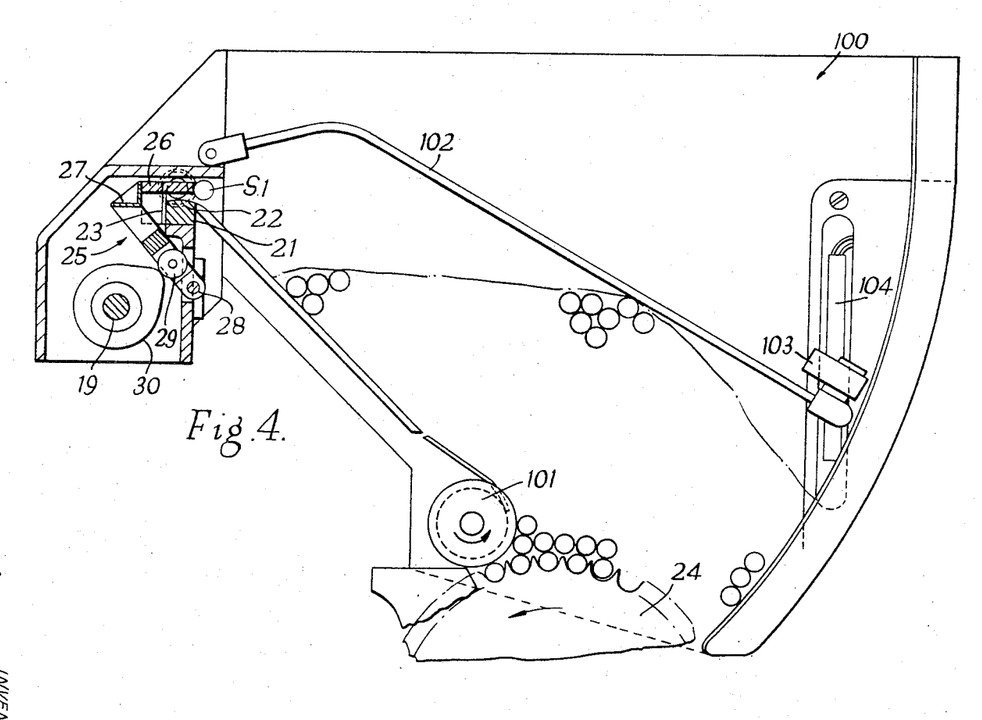
FIGURE 4 is an end elevation of part of the apparatus of the second embodiment.
Figures 5, 6:
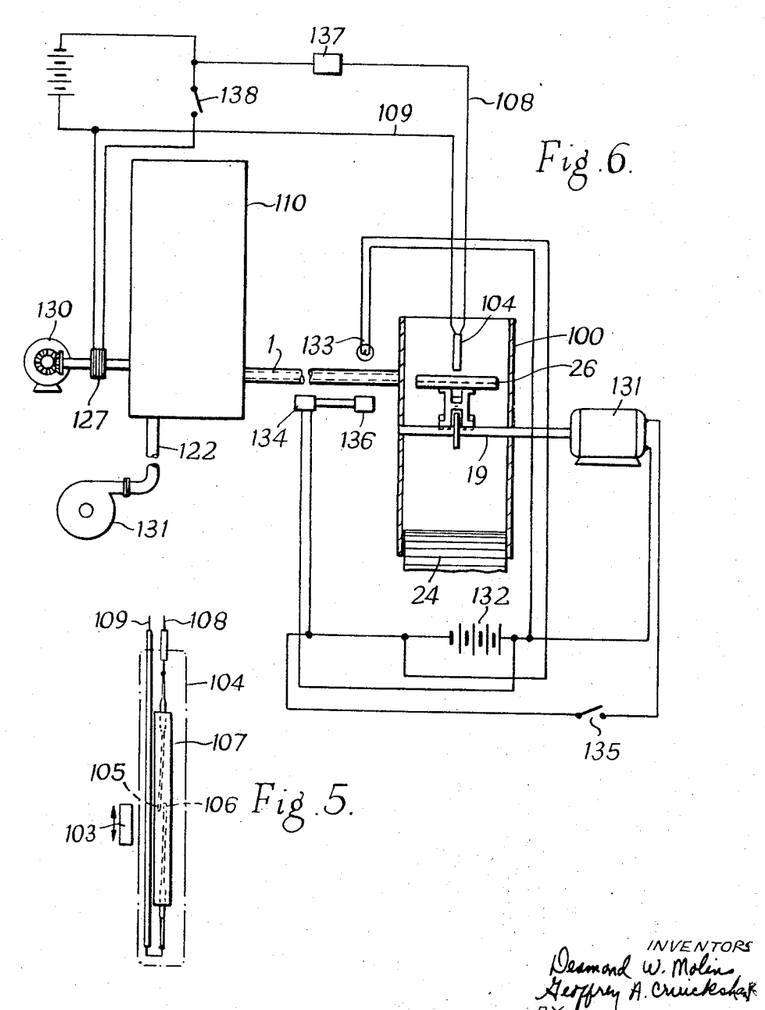
FIGURE 5 is a detail of FIGURE 4.
FIGURE 6 is a diagrammatic showing of the apparatus of the second embodiment.

The mechanism shown at the top left-hand end of FIGURE 4 is the same as that shown in the first embodiment, with the following differences. The view in FIGURE 4 is similar to that in FIGURE 3 except that the apparatus is of the opposite hand. The shaft 19 is driven by its own motor, as shown in FIGURE 6, independently of the machine which makes the mouthpiece cigarettes and incorporates the drum 24. The fluted drum 24 is not now adjacent the pusher 26 so that stubs are pushed directly into its flutes, but is below and spaced further away from the pusher. In this arrangement the drum 24 forms the lower wall of a stub hopper 100. The flutes of the drum 24 are, however, still parallel with the foremost stub $S_1$. Each foremost stub is now pushed laterally out of the line of stubs by the pusher 26 to roll into the hopper 100 and build up a reserve of stubs above the drum 24. A roller 101 rotates in the direction shown to assist the stubs entering the flutes of the drum without causing jams.

Pivoted at the upper left-hand part of the hopper is an arm 102 which is raised by the stubs in the hopper and which carries a magnet 103 at its other end. This arm can swing so that the magnet moves substantially vertically adjacent a reed relay 104 having switch contacts 105, 106 (see also FIGURE 5). When the magnet is raised by the arm 102 to a position where sufficient stubs are present in the hopper the contacts 105, 106 close and operate a further relay to stop the feeding of stubs. This will be referred to later. The two contacts 105, 106 are sealed in a glass tube 107 and leads 108, 109 are connected to the two contacts.

Figure 7:
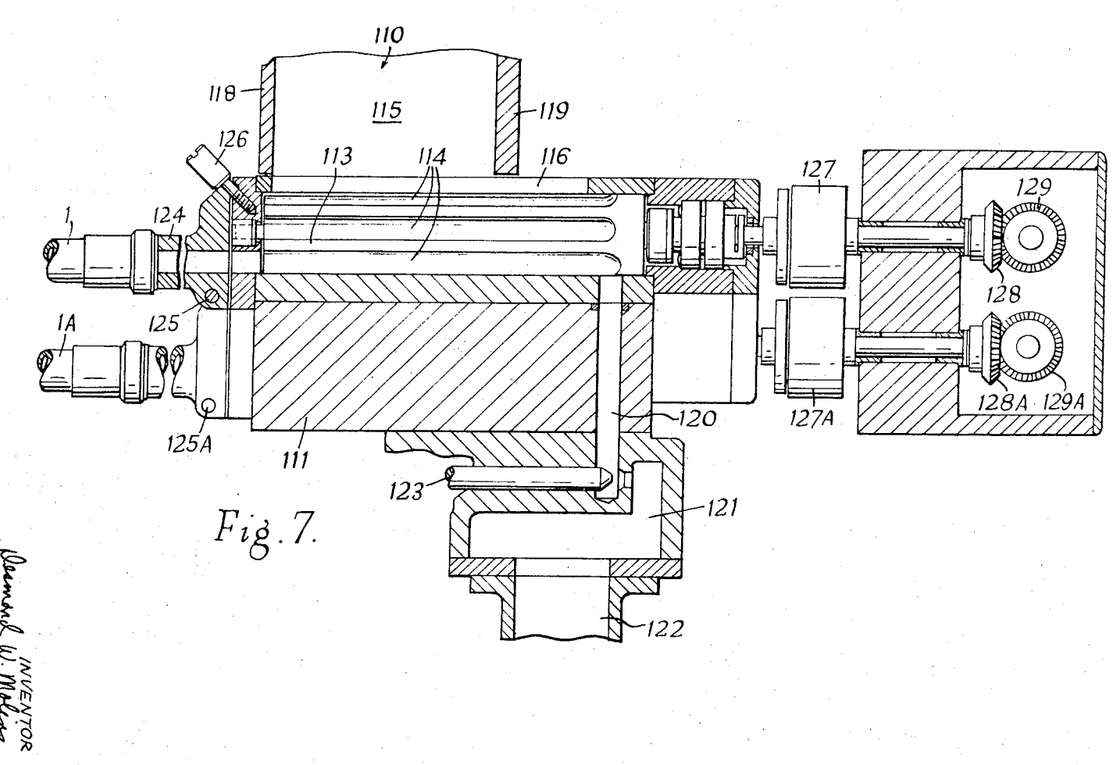
FIGURE 7 is a side elevation, partly in section of stub-feeding means.
Figure 8:
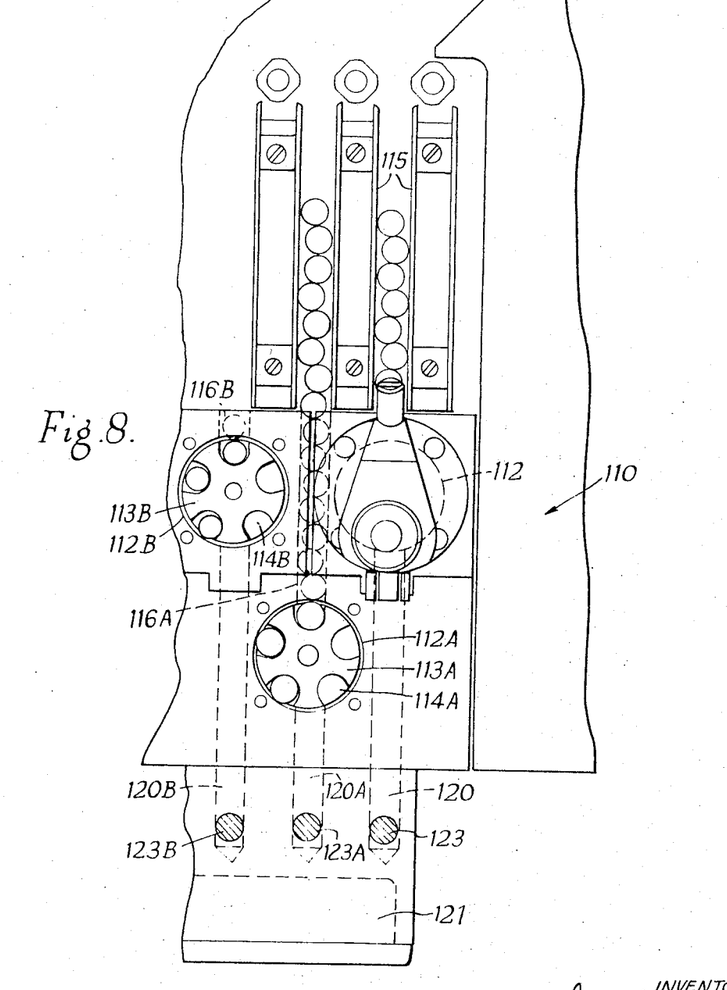
FIGURE 8 is an end view of the apparatus of FIGURE 7 with parts removed.

FIGURES 7 and 8 show stub-feeding apparatus 110 from which stubs are fed by air through a number of translucent polythene guide conduits 1, 1A etc. to an equal number of machines for making mouthpiece cigarettes. Each conduit 1, 1A etc. leads to apparatus as shown in FIGURE 4.

The stub feeding apparatus 110 comprises a body 111 with as many bores 112, 112A, 112B as there are hoppers and fluted drums such as 24 to be supplied with stubs. In each bore is a rotatable member 113, 113A, 113B having flutes 114, 114A, 114B. Pairs of vertical plates 115 contain between them vertical stacks of stubs, one stack for each member 113, 113A, 113B, and these stubs enter the members 113 etc. through vertical passages 116, 116A, 116B in the body 111. The stub-feeding apparatus also comprises a main hopper above the plates 115, one side wall of the hopper being shown at 117 in FIGURE 8 and the front and back walls 118, 119 being shown in FIGURE 7.

Air is supplied to the lowermost flute of each member 113, 113A, 113B through vertical bores 120, 120A, 120B which in turn are supplied from a common air chamber 121. The air pump 131 (see FIGURE 6) supplies the chamber through a pipe 122.

A valve member 123, 123A, 123B is provided to adjust the air flow through the vertical bores 120, 120A, 120B to compensate for any variations in the lengths of the guide conduits 1, 1A, etc.

In line with the lowermost flute of each member 113 is a guide tube 124, 124A etc. which leads to the conduits 1, 1A etc. Each guide tube is pivoted at its lower end about a pin 125, 125A etc. and is held in the position shown by a locking screw 126 etc.

The members 113, 113A etc. are driven through magnetic clutches 127, 127A etc. The clutches in turn being driven by the pairs of bevel gears 128, 129; 128A, 129A etc. from an electric motor 130 (FIGURE 6).

FIGURE 6 shows diagrammatically the general arrangement of the apparatus of this embodiment. Only the one guide conduit 1 is shown but it will be appreciated that, with the exception of the stub-feeding apparatus 110 and its associated air pump 131 and driving motor 130, all the rest of the apparatus is repeated in respect of each machine making mouthpiece cigarettes and having a fluted drum such as drum 24 to be supplied with stubs.

The shaft 19 of the means which retracts and operates the pusher member 26, the clamping member 33 and the stop member 6 is driven by a motor 131. A source of power for driving the motor 131 is shown at 132. From this power source a light source 133 and an amplifier and relay unit 134 are also supplied. The relay 134 when energized opens its associated switch 135 and breaks the circuit to the motor 131, so stopping further stubs being pushed into the hopper 100 by the pusher member 26. The relay 134 is energized by a photo-electric cell 136 which is positioned on the opposite side of the translucent guide conduit 1 to the light source 133.

The reed relay 104, when its contacts are closed by the magnet 103, energizes a relay 137 which opens its associated switch 138 and in turn de-energizes the magnetic clutch 127.

It is arranged that the stub-feeding apparatus 110 feeds stubs into each guide conduit 1, 1A etc. at a greater rate than the pusher member 26 can push each successive foremost stub into the associated hopper 100, and stubs are pushed into the hopper 100 at a greater rate than they are removed by the fluted drum 24.

When the members 113, 113A, 113B etc. rotate a stub from the associated vertical stack of stubs falls into the uppermost flute 114, 114A, 114B etc. and as the member 113 continues to rotate this stub is carried around until the flute is at its lowermost position where it is in line with the guide tube 124, 124A etc. and in communication with the air pipe 120, 120A, 120B etc. The stub is blown out of the flute 114, 114A, 114B etc. by the air, through the guide tube and the guide conduit 1, 1A etc. to be ejected from the other end of the guide conduit and have its lengthwise motion arrested by the stop member 6. This is repeated for each flute of the rotatable member 113, 113A, 113B etc. so that a series of stubs are blown endwise and in line through the guide conduits. As the stubs are fed into the guide conduits at a greater rate than the rate at which they are pushed by the pusher member 26 into the hopper 100 a line of abutting stubs is present in the downstream end of the conduit. This line of stubs prevents the light source 133 from energizing the photo-electric cell 136 and thus the switch 135 is closed and the motor 131 runs.

As the fluted drum 24 removes stubs from the hopper 100 at a slower rate than that at which they are pushed into the hopper the quantity of stubs therein increases until the arm 102 is raised sufficiently for the magnet 103 to operate the reed relay 104. This results in energization of the relay 137 and opening of the switch 138 to de-energize the clutch 127. Thus, feeding of stubs into the guide conduit 1 ceases but air continues to flow through the guide conduit and the pusher member 26 continues to remove each successive foremost stub into the hopper 100. This continues until the line of abutting stubs in the downstream end of the guide conduit passes the light source 133. This results in energization of the photo-electric cell 136 and the relay 134 and causes opening of the switch 135 and stopping of the motor 131, and thus the feed of stubs into the hopper 100 ceases.

The drum 24 rotates continuously while the machine of which it is a part, and which combines the stubs with cigarettes to form mouthpiece cigarettes, is operating so that the level of stubs in the hopper 100 will fall until the contacts of the reed relay 104 open and the clutch 127 is again energized. The apparatus 100 will then recommence to feed stubs into the guide conduit 1 but no stubs will immediately be pushed into the hopper 100. This feeding of stubs into the hopper 100 recommences when the line of abutting stubs in the downstream end of the guide conduit 1 builds up to stop light from the light source 133 reaching the photo-electric cell 136. When that happens the relay 134 is de-energized and the motor 131 recommences to drive the shaft 19.

It will be appreciated that the speed of rotation of the member 113, the speed of rotation of the shaft 19, the speed of rotation of the drum 24 and the predetermined distance of the photo-electric cell 136 and its light source 133 from the pusher member 26 are all chosen so that sufficient stubs are always present in the hopper 100 to supply the fluted drum 24.

Exactly the same sequence of events occurs in respect of each machine incorporating a drum such as the drum 24 and supplied with stubs along a guide conduit which in turn is supplied with stubs from a member such as 113A, 113B etc. in the stub-feeding apparatus 110.

The stub-feeding apparatus 110 may thus be arranged at any convenient place, the machines which are to be supplied with stubs and incorporate drums such as 24 may be widely spaced from each other and from the stub feeding apparatus 110. The feeding of stubs to each such drum as 24 is thus automatic.

The drum 24 may form part of apparatus such as that shown and described in United States patent specification No. 3,009,557. The stubs in the flutes of the drum 24 may be transferred into the flutes of the drum 1 in that specification where they are subdivided. Alternatively such subdivision could be carried out on the drum 24 itself by providing the drum with circumferential grooves and disc knives which enter the grooves.

What we claim as our invention and desire to secure by Letters Patent is:

1. Apparatus for handling rodlike articles comprising a guide means defining a passage, a conduit through which rodlike articles are fed lengthwise and in line by air flowing therethrough and connected to the guide means so that each successive foremost article is ejected from the passage by the air, a stop member in line with the passage to arrest the lengthwise motion of the foremost article and spaced more than the length of the article from the passage, support means for the article located between the passage and the stop means, a conveyor, the conveyor having channels arranged athwart its direction of motion, the conveyor being located in relation to the line of travel of the articles leaving the passage so that its channels are parallel with the articles and always laterally displaced therefrom, a pusher member, first operating means for the pusher member to move it in alternation between an operative position in which the pusher member moves into the line of the articles to push the foremost article laterally out of the line of articles to be received in a channel of the conveyor, and a retracted position in which the pusher member is withdrawn out of the line of the articles.

2. Apparatus for handling rodlike articles as claimed in claim 1 and comprising a clamping member, means defining an aperture in the guide means to receive the clamping member, second operating means for the clamping member to move the latter in alternation between an operative position in which the clamping member holds stationary the article next succeeding the foremost article, and a retracted position in which the clamping member is withdrawn from the article, third operating means for the stop member to move the latter in alternation between an operative position in which it arrests the lengthwise motion of the foremost article and a retracted position in which it is withdrawn from the article, and actuating means for the first, second and third operating means to actuate said operating means in the order (1) to move the stop member to its operating position (2) to move the clamping member to its operating position (3) to retract the stop member (4) to move the pusher member to push the foremost article out of the line of articles (5) to retract the pusher member and (6) to retract the clamping member.

3. Apparatus for handling rodlike articles as claimed in claim 2 wherein the first operating means comprises a first pivoted lever mounting the pusher member, and a first roller cam follower rotatably mounted on the first lever, the second operating means comprises a second pivoted lever mounting the clamping member, a leaf spring secured at one end to the guide member and at its other end to the clamping member, and a second roller cam follower rotatably mounted on the second lever, the third operating means comprises a third pivoted lever mounting the stop member, a compression spring bearing against the lever to move the stop member to the retracted position, and a third roller cam follower rotatably mounted on the third lever, and the actuating means comprises a rotatably mounted shaft, first and second edge cams mouned on the shaft for rotation therewith and cooperating respectively with the first and second cam followers, and an end cam mounted on the end of the shaft for rotation therewith and cooperating with the third cam follower.

4. Apparatus for handling rodlike articles as claimed in claim 2, wherein the conveyor is located adjacent the pusher member for the pusher member to push each successive foremost article directly into succeeding empty channels of the conveyor, and the actuating means is driven in timed relationship with the movement of the conveyor for the pusher member to move to its operative position when the next succeeding empty channel of the conveyor is in line with the pusher member.

5. Apparatus for handling rodlike articles as claimed in claim 2, and further comprising a hopper for the articles, the hopper being located lower than the pusher member to receive each successive foremost article removed from the line of articles by the pusher member, the conveyor being located to form the base of the hopper and to receive the articles in the hopper in its channels.

6. Apparatus for handling rodlike articles as claimed in claim 5 wherein the guide conduit is translucent, and comprising article-feeding means to feed articles into the guide conduit, means in the hopper to detect a predetermined quantity of articles therein and stop the article-feeding means, driving means for the actuating means, a photo-electric detector and a light source on opposite sides of the conduit a predetermined distance from the guide member to detect absence of an article therebetween and stop the driving means for the actuating means, the article-feeding means being adapted and arranged to feed articles at a greater rate than the speed of operation of the actuating means, and the actuating means being arranged to handle articles at a greater rate than the rate of removal of articles from the hopper by the conveyor.

7. Apparatus for handling rodlike articles comprising article-feeding means, a guide conduit to receive articles endwise and in line from the feeding means, means to supply air to the conduit to urge the articles therethrough, a hopper for the articles, article-receiving means to receive articles from the conduit, to arrest their lengthwise motion and remove them laterally one at a time from the line of articles into the hopper, a conveyor having channels arranged athwart its direction of motion to remove articles fom the hopper, detector means to detect a predetermined quantity of articles in the hopper and stop the article-feeding means, and means to detect less than a predetermined quantity of articles in the guide conduit and to stop the article-receiving means, the article-feeding means and the article-receiving means each being adapted and arranged to feed articles at a greater rate than the rate of removal of articles from the hopper by the conveyor.

8. Apparatus for handling rodlike articles comprising article-feeding means, a guide conduit to receive articles endwise and in line from the feeding means, means to supply air to the conduit to urge the articles therethrough, a hopper for the articles, article-receiving means to receive articles from the conduit and to separate each successive foremost article from the succeeding article and feed it into the hopper, means to remove articles from the hopper, detector means to detect a predetermined quantity of articles in the hopper and to stop the article-feeding means, means to detect less than a predetermined quantity of articles in the guide conduit and to stop the article-receiving means, the article-feeding means being adapted and arranged to feed articles at a greater rate than the rate of removal of articles from the hopper.

9. Apparatus for handling rodlike articles comprising article-feeding means, a guide conduit to receive articles endwise and in line from the feeding means, means to supply air to the conduit to urge the articles therethrough, a hopper for the articles, article-receiving means to receive articles from the conduit and to arrest the lengthwise motion of each successive foremost article and to separate it laterally from the succeeding article by feeding it laterally into the hopper, means to remove articles from the hopper, detector means to detect a predetermined quantity of articles in the hopper and to stop the article-feeding means, means to detect less than a predetermined quantity of articles in the guide conduit and to stop the article-receiving means, the article-feeding means being adapted and arranged to feed articles at a greater rate than the rate of removal of articles from the hopper.

10. Apparatus as claimed in claim 9 wherein the means to remove articles from the hopper is a conveyor having channels each to receive an article and arranged athwart the direction of motion of the conveyor.

11. Apparatus for dispensing rodlike articles, comprising in combination a hopper to which the articles are supplied, means to withdraw articles from the hopper, a conduit extending towards the hopper, feeding means to feed articles into the conduit, means to cause air to flow in the conduit to convey articles therethrough towards the hopper, transfer means associated with the hopper to receive articles from the conduit and transfer them into the hopper, first detector means to detect the quantity of articles in the hopper, control means responsive to said first detector means to control said feeding means, second detector means to detect the quantity of articles accumulated in the conduit, and further control means responsive to the said second detector means to control the operation of the transfer means.

12. Apparatus for dispensing rodlike articles, comprising in combination a hopper for articles, withdrawal means to withdraw articles from the hopper, a conduit extending towards the hopper, feeding means to feed articles into the conduit, means to cause air to flow in the conduit to convey articles therethrough towards the hopper, transfer means associated with the hopper to receive articles from the conduit and feed them into the hopper, said feeding means and said transfer means each being operable intermittently to feed articles at a higher rate than that at which said withdrawal means is operable to withdraw articles from the hopper, detector means to detect changes in the quantity of articles in the hopper, means responsive to said detector means to control the stopping and starting of the said feeding means and transfer means so as to maintain a reserve of articles in the hopper, and means to control the starting and stopping of the feeding means relatively to that of the transfer means so as to maintain a reserve of articles in the conduit.

13. Apparatus for supplying rodlike articles to a machine which utilises them and which has a hopper arranged to hold a store of articles, including withdrawal means to withdraw articles from the hopper for utilisation by the machine, a supply station remote from the machine, a conduit extending between the supply station and the machine, feeding means to feed articles in succession into the conduit, transfer means to receive articles in succession from the conduit and feed them into the hopper, means to cause air to flow in the conduit to transport articles therethrough towards the transfer means, the feeding means and transfer means both being arranged to operate intermittently to feed articles at a higher rate than that at which the withdrawal means withdraws articles from the hopper, and means coordinating the stopping and starting of said feeding means and transfer means to maintain a store of articles in the hopper and a reserve of articles in the conduit.

14. Apparatus for conveying rodlike articles, comprising in combination a guide conduit for the articles, means to cause air to flow through the conduit to urge the articles therethrough, feeding means to feed articles into the conduit at one end for conveyance therethrough, a hopper adjacent the other end of the conduit, transfer means associated with the hopper and positioned to receive articles from the conduit and arranged to transfer said articles into the hopper, means to remove articles from the hopper, first detector-means to detect the quantity of articles in the hopper, second detector-means to detect the quantity of articles in the conduit at the region adjacent the transfer means, means responsive to said first detector means to start and stop the operation of the feeding means so as to start and stop the feeding of articles into the conduit in accordance with the quantity of articles in the hopper, means responsive to said second detector means to cause the transfer means to cease transferring articles into the hopper when less than said predetermined quantity is in the conduit and to transfer articles when more than said predetermined quantity is in the conduit.

15. Apparatus for supplying articles to a machine which utilises them, the apparatus including a hopper associated with the machine and arranged to hold a store of articles, withdrawal means to withdraw articles from the hopper at a steady rate for utilization, a conduit extending towards the hopper, feeding means to feed articles into the conduit, transfer means to receive articles from the conduit and feed them into the hopper, means to cause air to flow in the conduit to convey articles therethrough towards the transfer means, said feeding means and transfer means each being operable intermittently to feed articles at a greater rate than that at which the withdrawal means operates to withdraw articles from the hopper, means to control the operation of the feeding means and transfer means to maintain the quantity of articles in said store in the hopper within predetermined limits, and means to maintain a reserve of articles in a part of the conduit through which air flows to urge them towards the transfer means, the conduit having at least one air escape aperture near the end adjacent the transfer means.

16. Apparatus for supplying rodlike articles to a machine which utilises them, the apparatus including a hopper associated with said machine and arranged to hold a store of articles arranged parallel to each other in a stack-like formation, withdrawal means to withdraw articles from the hopper at a steady rate for utilisation by the machine, a conduit extending towards the hopper, feeding means to feed articles lengthwise in succession into the conduit, means to cause air to flow in the conduit to convey articles therethrough, transfer means to receive articles travelling lengthwise from the conduit, said transfer means having a pushing element arranged to engage the sides of said articles and push them sideways into the hopper, and also including means to arrest the lengthwise movement of the articles, the said feeding means and said transfer means each being arranged to feed articles at a rate exceeding that at which the said withdrawal means withdraws articles from the hopper, and means to stop the operation of the feeding means and transfer means when the store of articles in the hopper exceeds a predetermined quantity and to prevent the operation of the transfer means if less than a predetermined quantity of articles is in the conduit within the range of action of the airflow.

17. Apparatus for supplying rods from a single supply station to a plurality of machines which utilise the rods, each machine having a hopper and means to withdraw rods therefrom for utilisation by the machine, the apparatus including a plurality of pneumatic rod transport units, one for each machine, each said unit including an air conduit having an inlet end at the supply station and an outlet end adjacent the hopper of a machine, a magazine at the supply station arranged to contain a column of rods one above another, a chamber to receive rods from said magazine and communicating with the inlet end of the conduit, means to introduce air under pressure into said chamber to cause air to flow through the conduit, feeding means to feed successive rods from the magazine into the chamber and to bring each rod in succession into register with the inlet end of the conduit in axial alignment therewith to be urged pneumatically therethrough, and transfer means adjacent the outlet end of the conduit, said transfer means including means to receive successive rods moving axially from the conduit and means to move said rods in succession in a transverse direction into the hopper.

18. Apparatus according to claim 17, wherein each said unit includes detector means associated with the hopper to detect the quantity of rods therein, and control means to regulate the operation of the said feeding means and transfer means to maintain the said quantity within predetermined limits.

19. Apparatus according to claim 18, wherein the control means acts in response to the detector means to start and stop the feeding means, and includes means to regulate the operation of the feeding means and transfer means to maintain a reserve of rods in the conduit adjacent the outlet end and within the range of action of air flowing through the conduit.

20. Apparatus according to claim 19, including a detector associated with the conduit to detect the quantity of rods therein, and means responsive to said detector to prevent operation of the transfer means unless a sufficient reserve is present in the conduit.

21. Pneumatic feeding apparatus for rodlike articles, including a conduit having an inlet end and an outlet end, feeding means to feed articles lengthwise into the inlet end, means to supply air under pressure to the conduit in the region of its inlet end to cause an airflow through the conduit towards its outlet end, receiving means located beyond the outlet end of the conduit to receive articles therefrom and having a deflector to deflect them in a transverse direction, an air escape aperture in the conduit near the outlet end, said feeding means and deflector being operable intermittently, and means to coordinate the operation of the feeding means and the deflector so that the deflector operates only when the conduit contains an accumulation of articles end to end in the region of the outlet end and extending upstream of said air escape aperture.

References Cited
UNITED STATES PATENTS

| | | | |
|---|---|---|---|
| 2,124,397 | 7/1938 | Gwinn et al. | |
| 2,988,402 | 6/1961 | Policansky | 302—2 |
| 3,042,454 | 7/1962 | Eissmann et al. | 302—2 |
| 3,059,651 | 10/1962 | Molins et al. | 131—94 |
| 3,062,588 | 11/1962 | Molins et al. | 302—2 |
| 3,089,732 | 5/1963 | Gamberini | 302—2 |
| 3,136,320 | 6/1964 | Molins et al. | 131—94 |
| 3,336,085 | 8/1967 | Strydom | 302—2 |

ANDRES H. NIELSEN, *Primary Examiner.*